United States Patent
Parker

[15] 3,673,503
[45] June 27, 1972

[54] HARMONIC SUPPRESSION CIRCUIT
[72] Inventor: Harold F. Parker, Lee, Mass.
[73] Assignee: General Electric Company
[22] Filed: July 6, 1971
[21] Appl. No.: 160,034

[52] U.S. Cl..............................328/167, 328/16, 328/140,
    328/155, 330/31, 73/67.2, 324/57 R, 325/476
[51] Int. Cl. ........................................................H03b 1/04
[58] Field of Search....................328/165, 167, 16, 140, 155;
    325/475, 476; 73/67.2; 324/57 R; 330/31

[56] References Cited

UNITED STATES PATENTS

| | | |
|---|---|---|
| 2,876,638 | 3/1959 | Diamond..................................73/67.2 |
| 3,015,728 | 1/1962 | Richman.............................328/167 X |
| 3,014,127 | 12/1961 | Vlasak................................328/167 X |
| 3,132,339 | 5/1964 | Boughnou..........................328/165 X |
| 3,213,450 | 10/1965 | Goor....................................325/475 X |
| 3,550,011 | 12/1970 | Dubowicz et al. ......................325/475 |

Primary Examiner—John S. Heyman
Attorney—J. Wesley Haubner, et al.

[57] ABSTRACT

A harmonic suppression circuit in which the fundamental component of the test voltage is blocked out by means of a phase inverting, frequency selective amplifier while the harmonic component of the test voltage is fed back out of phase with the normally generated harmonic component of the test voltage.

3 Claims, 1 Drawing Figure

PATENTED JUN 27 1972
3,673,503
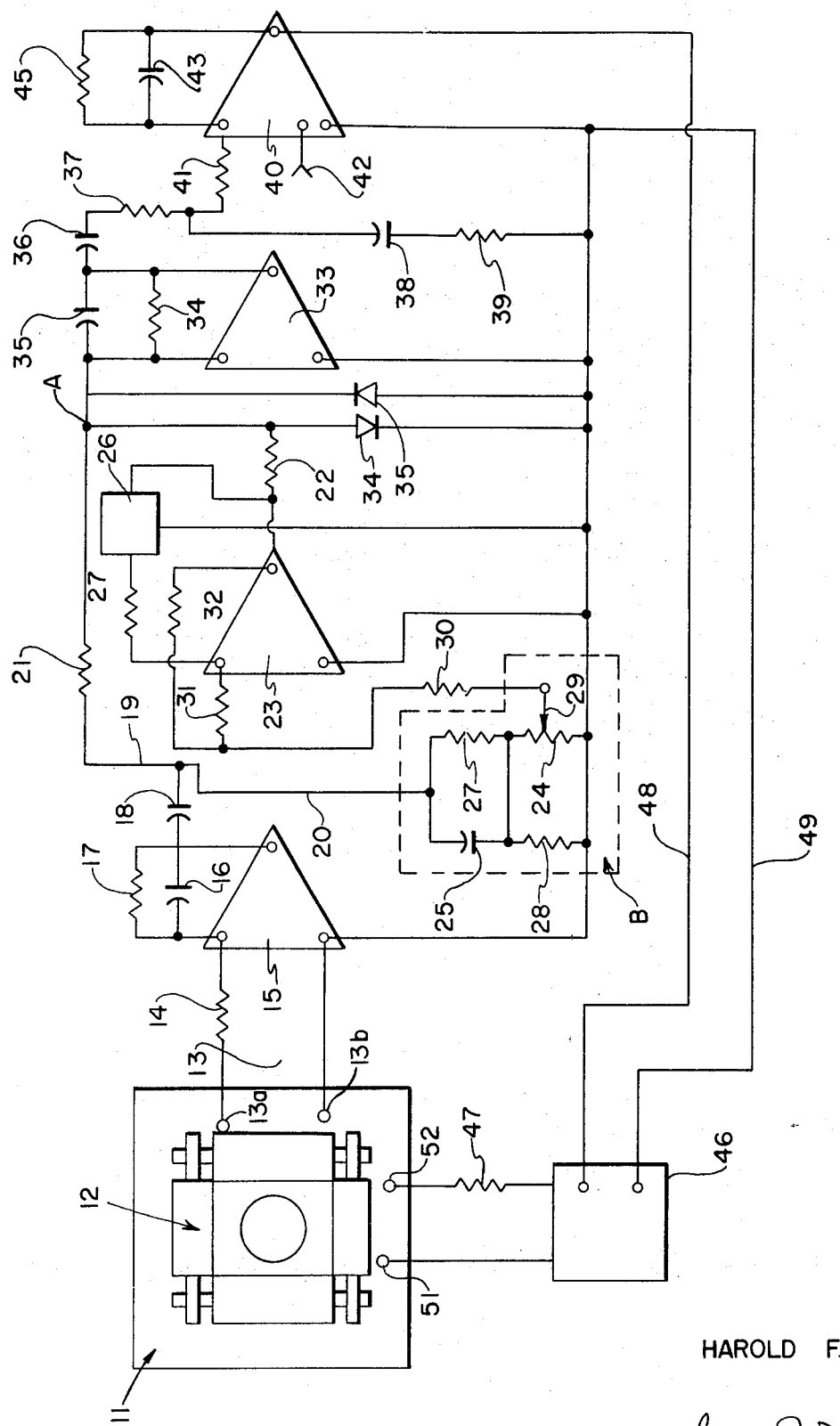
INVENTOR
HAROLD F. PARKER
ATTORNEY

HARMONIC SUPPRESSION CIRCUIT

BACKGROUND OF THE INVENTION

1. Field of the Invention

The present invention relates to the suppression of harmonics generated from materials such as steel, when these materials are subjected to measurements and tests utilizing predetermined frequency signal sources. The harmonic suppression circuit of this invention particularly relates to the harmonic suppression of undesired frequencies generated as steel sheets are undergoing various Epstein tests.

2. Description of the Prior Art

There are two usual approaches to harmonic suppression in steel testing and measuring systems.

One of the most common methods, known to the art, is the "brute force" approach whereby nearly all of the output of the test voltage developed at one point is fed back in phase opposition to excitation voltage. The magnitude of the excitation voltage is then made larger than the voltage being fed back, to excite a power amplifier to the required level. In this method, the harmonics are suppressed in proportion to the amount of voltage being fed back. This approach is limited by the magnitude of the test voltage in relation to the magnitude of the excitation voltage required to drive the power amplifier.

Another known approach in the suppression of harmonics generated when a steel sheet is undergoing the tests herein referred to, is to use parallel or other passive filter networks to filter out the fundamental components of voltage and to feedback the harmonic residue. This approach is limited by the problems introduced by phase characteristics of the passive filters used to suppress the fundamental components and the phase characteristics of the other components in the feedback circuit.

These problems have been substantially eliminated by this invention by providing the fundamental components of the test voltage to be blocked out by means of a phase inverting frequency selective amplifier while the harmonic components of the test voltage are allowed to be fed back 180° out of phase with the normally generated harmonic component of the test voltage.

SUMMARY OF THE INVENTION

A stack of steel sheets all substantially alike may be assembled in an Epstein jig or frame, well known in the art, to allow various quality tests to be performed on these sheets of steel. To suppress the harmonics appearing in the output of a test signal voltage which would be generated by the activated steel sheets, and which output voltage is to be used in quality testing, this output voltage is fed through a buffer amplifier and then through an attenuator to the input of a frequency selective amplifier and also through a predetermined resistance to the output of the frequency selective amplifier. The fundamental frequency of the voltage at the output of this frequency selective amplifier is bucked out by adjusting the amount of voltage being fed to the input of this amplifier by means of a potentiometer control in the lower portion of an input attenuator.

The harmonic residue voltage is then amplified and fed into one of the inputs of an amplifier the output thereof being an amplified harmonic residue voltage is then fed into the power signal source and applied to the input of the test jig with the proper phase and magnitudes to minimize the harmonic components in the output test voltage.

It is therefore an object of this invention to provide a harmonic suppression circuit to be utilized in steel testing which is not limited by the magnitude of the test voltage in relation to the magnitude of the excitation voltage required to drive the power amplifier in the system.

Another object is to provide a harmonic suppression circuit not limited by the phase characteristics of passive filters which may be used to suppress the fundamental components of the test voltage.

Briefly stated, in accordance with one aspect of this invention, the foregoing objects are achieved by providing a harmonic suppression circuit in which the fundamental frequency of the test voltage is bucked out by means of a phase inverting frequency selective amplifier while the harmonic frequencies of the test voltage are fed back out of phase with the normally produced harmonic frequencies of the material being measured.

Other objects and advantages of the invention will become apparent to those skilled in the art upon reading the specification in conjunction with the drawing in which:

BRIEF DESCRIPTION OF THE DRAWING

The FIGURE is a schematic representation of the harmonic suppression circuit in accordance with the invention.

DETAILED DESCRIPTION

The invention may be better understood by reference to the following detailed description of an embodiment thereof when taken in conjunction with the accompanying drawing:

Referring to the FIGURE, an Epstein test frame or jig 12, having appropriate coils therein, is provided with a pair of signal output terminals 13a and 13b. A signal 13 containing an applied input fundamental frequency, as well as the harmonic frequencies developed as a result of steel under test placed in the jig is developed at terminals 13a and 13b. Terminal 13b is the common or reference terminal for said signal, and terminal 13a is the fundamental and harmonic signal terminal.

The signal appearing at terminal 13a is coupled to a first input of a buffer amplifier 15 through a resistor 14. A second input of buffer amplifier 15 is connected to common terminal 13b. The buffer amplifier 15, such as is well known in the art, has a parallel resistor-capacitor circuit comprising resistor 17 and capacitor 16 coupled between the first input and the output of said buffer amplifier 15.

The output of buffer amplifier 15 is coupled to a first signal path 19 and a second signal path 20 through a coupling capacitor 18. The first signal path 19 is further connected to a terminal A through a resistor 21. The second signal path 20 is connected to one terminal of attenuator B formed by a parallel circuit comprising a first series circuit including a capacitor 25 and resistor 28 and a second series circuit including a resistor 27 and a variable resistor or potentiometer 24. The common connection between capacitor 25 and resistor 28 is connected to the common connection between resistor 27 and resistor 24. The other terminal of attenuator B is connected to common terminal 13b.

The output of attenuator B appears at potentiometer arm or tap 29 and is coupled to a first input terminal of frequency selective amplifier 23 through a series resistor path including resistors 30 and 31. The second input of frequency selective amplifier 23 is connected to common terminal 13b.

The output terminal of frequency selective amplifier 23 has a resistor 22 connected to terminal A and is coupled to the first input terminal of frequency selective amplifier 23 through a parallel T filter 26, well known in the art, and the same output terminal is further coupled to the input through a resistor 32 to the common junction of resistors 30 and 31. As is customary, one terminal of filter 26 is connected to terminal 13b.

A pair of reversely connected diodes 34 and 35, whose function will be explained later, are connected between terminal A and common terminal 13b.

A harmonic residue signal appearing at terminal A is coupled to a first input terminal of amplifier 33 which provides means for amplifying and for reversing the phase of the harmonic residue signal of amplifier 33, the second input terminal of said amplifier 33 being connected to common terminal 13b. The output of amplifier 33 is coupled back to the first input terminal of amplifier 33 through a parallel resistor-capacitor network comprising resistor 34 and capacitor 35.

The output of amplifier 33 is further coupled to a first input of driving means or amplifier 40 through a divider network comprising a series circuit including a coupling capacitor 36, a first resistor 37, a capacitor 38, and a resistor 39, with resistor 39 having the free end thereof connected to terminal 13b. The output of the divider network is obtained at a point common to resistor 37 and capacitor 38 and is fed to a first input terminal of amplifier 40 through a resistor 41. A second input terminal of amplifier 40 is connected to common terminal 13b. A third input to amplifier 40 is the applied input fundamental frequency 42. The output of amplifier 40 is fed back to the first input terminal thereof through a parallel resistor capacitor network comprising resistor 45 and capacitor 43.

The output from amplifier 40 further is fed to power signal source 46 through lines 48 and 49, said power signal source 46 being connected to the signal input terminals 51 and 52 of the Epstein test jig 13 through a series resistor 47 in a manner well known in the art.

In operation, the signal 13 comprises a fundamental frequency and harmonic frequencies. Signal 13 is amplified through buffer amplifier 15 and at the output of buffer amplifier 15 takes a first path 19 and a second path 20, both paths 19 and 20 leading to terminal A.

First path 19 carries the fundamental frequency plus the harmonic frequencies through resistor 21 to terminal A in substantially the same form that they were in at the output of buffer amplifier 15.

The second path 20 allows signal 13 to flow through attenuator B to the input of frequency selective amplifier 23. The attenuator B utilizes capacitor 25 to provide any phase correction in the event of feedback through the parallel T filter 26. The attenuator B also utilizes the variable resistor 24 or potentiometer to provide proper magnitude control of signal 13 as signal 13 enters frequency selective amplifier 23.

The parallel T network 26 is tuned for the fundamental frequency utilized which may be 60 or 400 Hz in typical steel testing.

The fundamental frequency of signal 13 is bucked out at point A by adjusting the amount of voltage being fed into the input of amplifier 23 by means of potentiometer tap 29 of variable resistor 24 in the lower portion of the attenuator B.

Amplifier 23, which is frequency selective to the fundamental frequency utilized in this system, filters out the harmonic frequencies of signal 13 as they travel through second path 20.

Therefore, at terminal A, the fundamental frequency plus the harmonic frequencies of signal 13 through first path 19 will be combined with the fundamental frequency equal in magnitude but 180° out of phase through the second path 20.

The resulting signal formed from the combination of signal 13 through the first path 19 and second path 20 at point A is a harmonic residue signal. This harmonic residue signal will be in phase with any harmonic frequency produced at the output of buffer amplifier 15.

The reversely-connected diodes 34 and 35 are utilized to protect against the overload of the input to amplifier 33. The harmonic residue signal at terminal A is fed into an input of amplifier 33. The output of amplifier 33, which contains the amplified residual signal with a 180 degree phase reversal, is further coupled to driving means or amplifier 40 through a divider network. This divider network at the output of amplifier 33 tailors the overall frequency characteristics at the high and low frequency extremes to allow harmonic suppression circuits for different test frequencies to be switched without causing oscillation.

Amplifier 40 provides means for amplifying and for reversing by 180° the phase of the harmonic residue signal and thus puts the harmonic residue signal out of phase with normally generated harmonic frequency of signal 13 at output 13a.

The harmonic residue signal is therefore fed into power signal source 46 with the proper phase and magnitude to minimize the harmonic frequency in signal 13. In effect, this will result in the driving of the steel sheet 11 with a signal which is not clean and the results will be a signal 13 which will be relatively clean.

The non-linear characteristics of the steel which usually produce odd harmonics and the output transformer in the power signal source 46 (not shown) limit the amount of harmonic feedback that can be obtained and still retain stability of operation. With the above approach the level of any harmonic in the signal 13 is reduced to less than 1 percent of the fundamental frequency for tests at 10 H and to level in the order of a few tenths percent when testing at flux density level of 10 to 17 kilogauss.

While various views of the invention have been shown and described, it will be apparent to those skilled in the art that many modifications are possible. The invention, therefore, is not to be restricted except insofar as it is necessary by the prior art and by the spirit of the appended claims.

What is claimed as new and desired to be secured by Letters Patent of the United States is:

1. A harmonic suppression circuit for use in test apparatus wherein harmonics are generated by a material under test as a fundamental frequency is applied to the input of said apparatus to develop an output signal, said circuit comprising:
   circuit means for coupling said output signal to a first path and a second path, said first path and said second path having a common input and a common output;
   circuit means in said second path for substantially reducing said harmonic frequencies, and amplifying and reversing the phase of said fundamental frequency in said second path;
   circuit means for recombining said signals from said first and said second path at said common output to provide a residue signal comprising substantially said harmonic frequencies of said output signal; and
   circuit means for combining said residue signal with said fundamental frequency of said output signal at the input of said test apparatus.

2. A circuit as in claim 1 wherein said circuit means for reducing said harmonic frequencies and amplifying and reversing the phase of said fundamental frequency in said second path comprises an attenuator and a frequency selective amplifier, the output of said attenuator connected to the input of said frequency selective amplifier.

3. A circuit as in claim 2 wherein said attenuator includes a potentiometer.

* * * * *